UNITED STATES PATENT OFFICE.

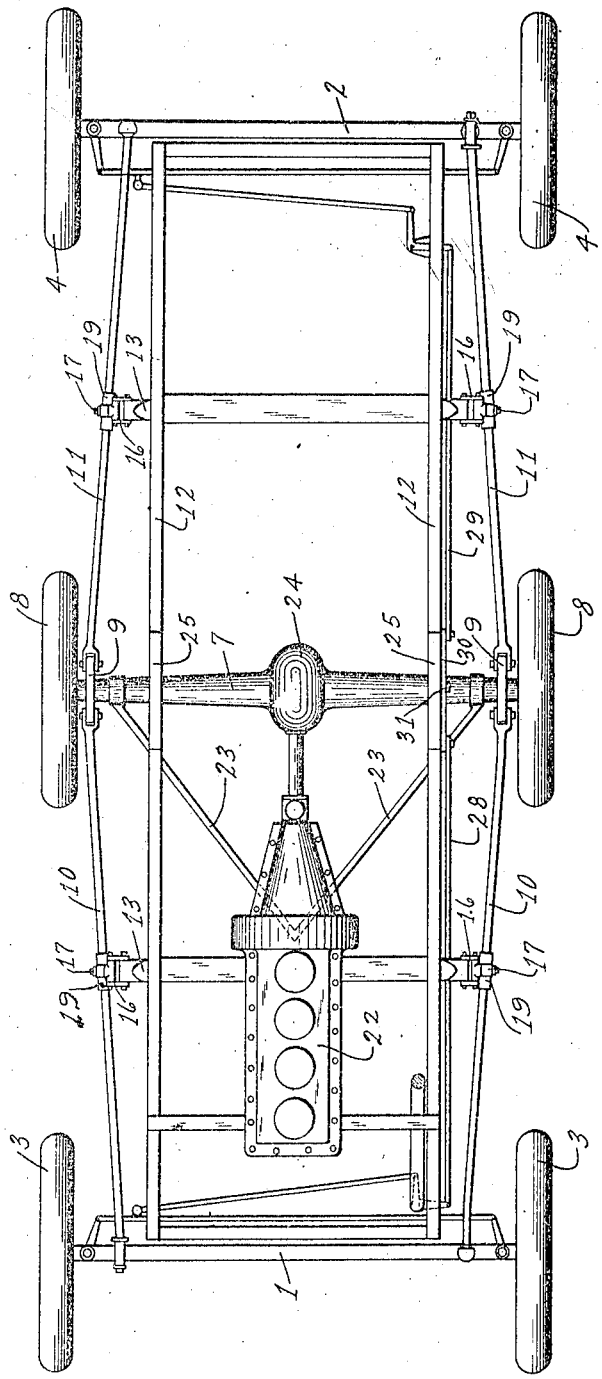

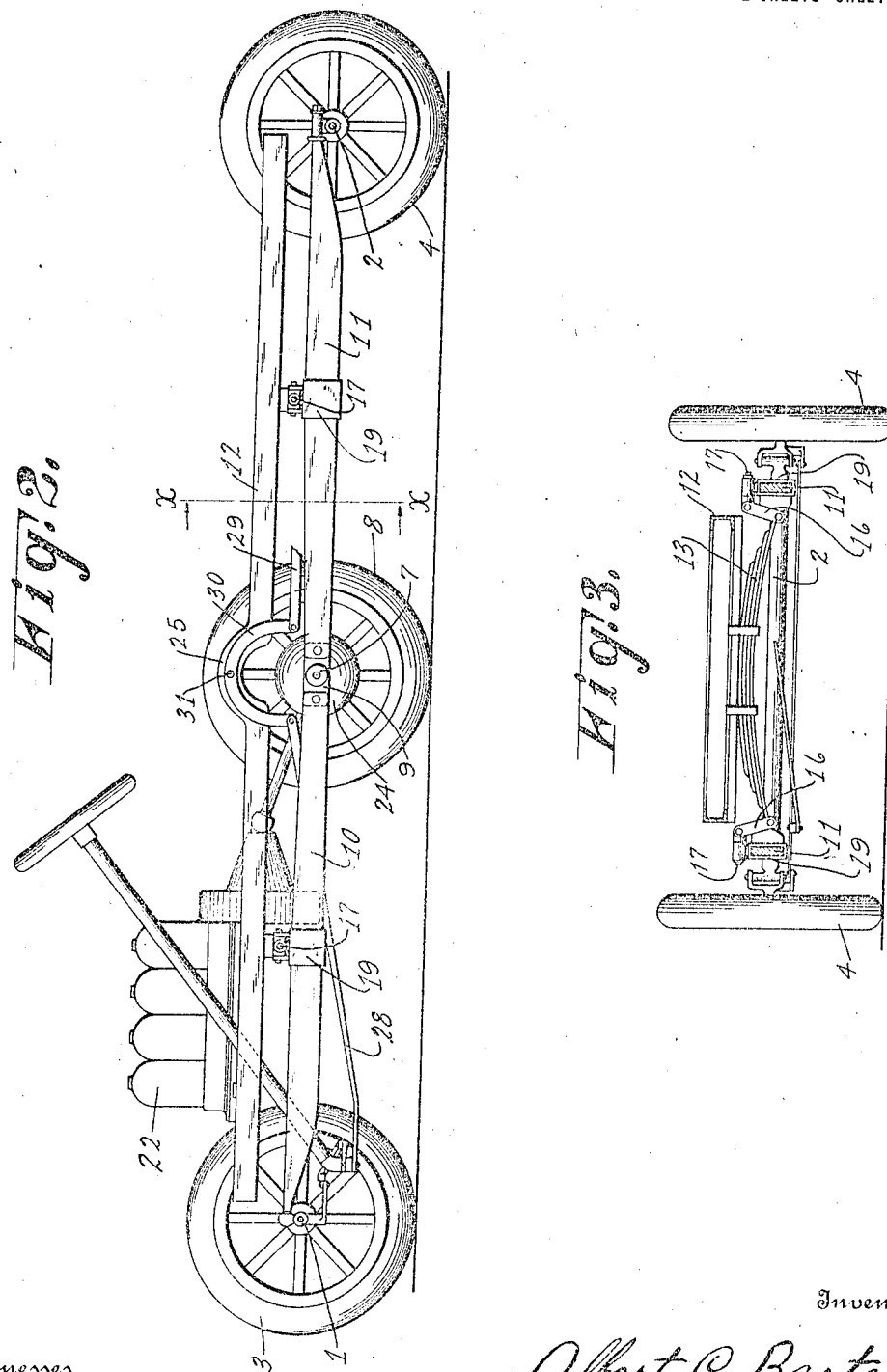

ALBERT C. BARTELT, OF MEDFORD, WISCONSIN.

MOTOR-DRIVEN VEHICLE.

1,291,724.               Specification of Letters Patent.     Patented Jan. 21, 1919.

Application filed September 7, 1915.   Serial No. 49,191.

*To all whom it may concern:*

Be it known that I, ALBERT C. BARTELT, a citizen of the United States, residing at Medford, county of Taylor, and State of Wisconsin, have invented new and useful Improvements in Motor-Driven Vehicles, of which the following is a specification.

My invention relates to improvements in motor driven vehicles.

The object of my invention is to so modify the movements, particularly the vertical movements, transmitted to the main frame through the vehicle wheels when traveling over rough or uneven roads, as to relieve the main frame, the supporting springs, the engine, and the passengers from shocks and jolts to a large extent, and also to allow the wheels to lift and pass over obstructions more easily than in an ordinary vehicle.

A further object of my invention is to provide a more adequate and flexible support for the main frame, to extend the wheel base and at the same time facilitate short turning movements, and to properly distribute and equalize the load upon six wheels instead of four.

In the drawings—

Figure 1 is a plan view of a motor driven vehicle embodying my invention, with the body removed.

Fig. 2 is a side elevation of the same.

Fig. 3 is a sectional view, drawn on line *x—x* of Fig. 2.

Like parts are identified by the same reference characters throughout the several views.

The front and rear axles 1 and 2 are provided with steering wheels 3 and 4, respectively. Substantially midway between the front and rear axle, is a hollow supporting axle 7 provided with traction wheels 8. Loose collars 9 on the axle 7 near its respective ends, are each connected with the front and rear axles by link rods 10 and 11.

The main frame 12 is supported by springs 13 from the link rods 10 and 11 respectively, by means of links 16 and transverse rocking arms or shafts 17, the latter being journaled in supporting bearing members 19 mounted on the link rods 10 (or 11). The load carried by the main frame including its own weight, is therefore supported by the link rods at points intermediate of the middle axle and the respective end axles.

The engine 22 is mounted on the main frame and its power is transmitted to the traction wheels 8 through the hollow axle 7 in the usual manner. The latter is connected to the main frame by strut rods 23. 24 is a differential gear casing. The main frame is arched at 25 over the axle 7, whereby the latter may move vertically to any ordinary extent without striking the frame. Steering movements are transmitted to the rear wheels through link rods 28 and 29 and an intermediate oscillatory yoke 30 pivoted to the main frame at 31.

The links 16 permit limited relative movements of the main frame laterally, and the rock arms or shafts 17 permit limited longitudinal movements, these movements, or the pressures which produce them, being in turn absorbed or distributed by the springs. The subframe provided by the axles and link rods is therefore very flexible, and each wheel can conform to the roadway without setting up strains.

While I have referred to the connection for the main frame with the rods 10 and 11 as distributing and equalizing the load, I do not mean thereby that an equal portion of the load is carried by all of the axles, since it is obvious that in the construction illustrated one-half of the total load is carried by the axle 7 and the traction wheels. The link rods and the rocker bearing and link connections of the main frame therewith, are effective however in distributing or equalizing the load in the sense of preventing excessive strains at any one point.

I claim—

1. In a six wheel vehicle having front and rear axles, the combination of an intermediate axle, a spring supported main frame arched over the intermediate axle, link connections between the intermediate axle and the front and rear axles respectively, stub axles connecting the front and rear wheels with their respective supporting axles, and a steering head operatively connected with all of the stub axles.

2. In a six wheel vehicle having front and rear axles, the combination of an intermediate axle, a spring supported main frame arched over the intermediate axle, link connections between the intermediate axle and the front and rear axles respectively, stub axles connecting the front and rear wheels with their respective supporting axles, and a steering head operatively connected with all of the stub axles, said connections including an oscillatory yoke pivoted to the arched portion of the main frame and link rods connected with the respective ends of said yoke in front and to the rear of the intermediate axle.

In testimony whereof I affix my signature in the presence of two witnesses.

ALBERT C. BARTELT.

Witnesses:
  LEVERETT C. WHEELER,
  OTTO H. SCHUMACHER.